United States Patent Office 3,644,409
Patented Feb. 22, 1972

---

3,644,409
RADIOPAQUE COMPOUNDS AND METHODS OF PREPARING THE SAME
Ernst Felder and Davide Pitre, Milan, Italy, assignors to Bracco Industria Chimica, Societa per Azioni, Milan, Italy
No Drawing. Continuation of application Ser. No. 709,778, Mar. 1, 1968. This application May 28, 1970, Ser. No. 41,724
Int. Cl. C07d 27/08, 29/22, 87/30
U.S. Cl. 260—247.2                                    11 Claims

ABSTRACT OF THE DISCLOSURE

Compounds of the formula

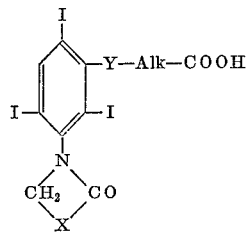

are radiopaque, tend to collect in the gall bladder when ingested orally, and are well tolerated, if X has 2–4 carbon atoms and is alkylene or alkylenoxyalkylene, Y is a single carbon-to-carbon bond or oxygen, and Alk is lower alkylene or phenyl-lower-alkylene having not more than four carbon atoms in the alkylene group. The physiologically tolerated salts of the above carboxylic acids have the same effects. The compounds are prepared by closure of the ring

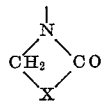

when otherwise similar compounds having the group

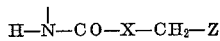

are exposed to alkali metal hydroxide in a strongly alkaline aqueous medium and are precipitated when the medium is acidified after ring formation.

---

This is a continuation of Ser. No. 709,778 now abandoned.

BACKGROUND OF THE DISCLOSURE

This invention relates to medical radiology, and particularly to radiopaque compounds, their preparation, and their use, especially in cholecystography.

It is known to make body cavities, such as the gall bladder, opaque to X-rays by accumulating in such cavities organic compounds rich in iodine. The known radiopaque compounds employed heretofore for this purpose are not fully satisfactory. Those that may be applied orally are resorbed only to a small extent so that full opacity in the desired regions is not readily achieved. They are not well tolerated in the high dosage rates necessary for proper contrast, and may cause diarrhea. The intravenous application of radiopaque materials suitable for visualizing the gall bladder is potentially dangerous, and lethal accidents are being reported in a significant number of cases (La Radiologia Medica, 52, July 1966, pp. 626–657). There is still a need for improved radiopaque compisitions.

In order to be effective when applied in relatively small amounts, a radiopaque material for cholecystography should accumulate preferentially in the gall bladder. The ultimate test of effectiveness, however, is the quality of the X-ray pictures capable of being produced. It is essential that radiopaque materials be non-toxic.

The object of the invention is the provision of new iodine bearing compounds which combine the desired properties, of compositions which permit the compounds to be applied in a convenient manner, and of methods for making and using the compounds and the compositions based thereon.

SUMMARY OF THE INVENTION

It has been found that compounds of the formula

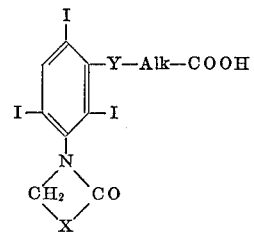

combine the properties desirable in radiopaque material for cholecystography and in radiology generally if X has 2 to 4 carbon atoms and is alkylene or alkylenoxyalkylene, Y is a single carbon-to-carbon bond or oxygen, and Alk is lower alkylene or phenyl-lower-alkylene having not more than four carbon atoms in the alkylene group. The physiologically tolerated salts of the carboxylic acids defined by the above formula are equally effective.

We have successfully employed the sodium, lithium, calcium, and magnesium salts, also the salts of the aforedefined acids with the non-toxic amines commonly employed in pharmaceutical chemistry such as the N-methylglucamine, diethanolamine, and morpholine salts.

The toxicities of typical compounds of the invention to white mice ($DL_{50}$) are listed in Table I hereinbelow for oral (p. os) and intravenous (i.v.) application, also the percentage of each compound which was excreted with the bile and with the urine by rabbits three hours after intravenous injection of 100 mg. per kg. body weight. The ratio of the excretion percentage figures is a measure of the preferential accumulation of the compound in the gall bladder.

The following compounds of the invention are identified by capital letters in Table I:

A: α-Ethyl-β-3-N-butyrolactamyl-2,4,6-triiodophenyl-propionic acid
B: α-Ethyl-β-3-(morpholinon-3'-yl-4')-2,4,6-triiodophenyl-propionic acid
C: α-Ethyl-β-3-(N-δ-valerolactamyl)-2,4,6-triiodophenyl-propionic acid
D: α-Phenyl-β-3-N-butyrolactamyl-2,4,6-triiodophenyl-propionic acid
E: α-Phenyl-β-3-(N-δ-valerolactamyl)-2,4,6-triiodophenyl-propionic acid
F: α-Phenyl-β-(3-morpholinon-3'-yl-4')-2,4,6-triiodophenyl-propionic acid By way of comparison, corresponding data are also listed for iopanoic acid (G), the radiopaque material considered best heretofore for cholecystography, and for iophenoic acid (H) and iopodate (I), compounds chemically related to those of the invention which have found practical application in radiology:

G: α-Ethyl-β-3-amino-2,4,6-triiodophenyl-propionic acid
H: α-Ethyl-β-3-hydroxy-2,4,6-triiodophenyl-propionic acid
I: β-3-dimethylaminomethyleneamino-2,4,6-triiodophenyl-propionic acid

TABLE I

| Compound | Toxicity, $DL_{50}$, mg./kg. | | Secretion, percent | | Ratio, bile/urine |
| --- | --- | --- | --- | --- | --- |
| | P. os | I.v. | Bile | Urine | |
| A | 1,700 | 610 | 35.8 | 7.8 | 4.6 |
| B | 1,650 | 650 | 22 | 7.8 | 2.8 |
| C | 2,000 | 1,200 | 24.6 | 12.4 | 2 |
| D | 1,600 | 450 | 35.3 | 8.9 | 3.96 |
| E | 2,150 | 500 | 50 | 15 | 3.33 |
| F | 2,300 | 490 | 40.29 | 8.12 | 4.96 |
| G | 1,540 | 285 | 28 | 13 | 2.15 |
| H | 1,360 | 345 | 12.3 | 30 | 0.4 |
| I | 855 | 240 | 15.4 | 13.4 | 1.1 |

The secretion data of Table I, which are based on chemical analysis, have been confirmed in actual cholecystography. Quite surprisingly, other compounds of the invention in which the chemical data were less favorable also produce good or even excellent contrast in X-ray photographs as is shown in Table II which lists data corresponding to those of Table I and additionally a rating of contrast produced in cholecystograms of dogs which were given orally 200 mg./kg. of the compounds.

TABLE II

| Compound | Toxicity, $DL_{50}$, mg./kg. | | Secretion, percent | | Ratio, bile urine | Contrast |
| --- | --- | --- | --- | --- | --- | --- |
| | P. os | I.v. | Bile | Urine | | |
| K | 3,200 | 1,200 | 20.2 | 61.0 | 0.33 | Excellent.[1] |
| L | 2,850 | 720 | 25.6 | 31.3 | 0.82 | Do. |
| M | 1,650 | 490 | 29.7 | 23.7 | 1.2 | Good |
| N | 2,400 | 670 | 20 | 16.5 | 1.27 | Fairly good. |
| O | 2,500 | 720 | 32 | 22 | 1.46 | Do.[2] |
| P | 5,700 | 860 | 31 | 30 | 1.05 | Good.[3] |

[1] From 4th to 24th hour.
[2] From 6th to 8th hour.
[3] Up to 24 hours.

The compounds listed in Table II, most of which have extremely low toxicity, are identified as follows:

K: 3-N-butyrolactamyl-2,4,6-triiodophenylacetic acid
L: α-3-(morpholinon-3'-yl-4')-2,4,6-triiodophenyl-butyric acid
M: α-3-N-butyrolactamyl-2,4,6-triiodophenyl-butyric acid
N: α-3-N-butyrolactamyl-2,4,6-triiodophenyl-propionic acid
O: α-3-N-butyrolactamyl-2,4,6-triiodophenoxy-phenylacetic acid
P: α-3-(morpholinon-3'-yl-4')-2,4,6-triiodophenoxy-phenylacetic acid The radiopaque acids of the invention are prepared by dispersing a compound of the formula

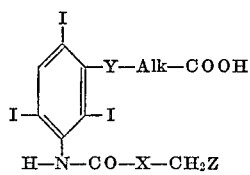

in an aqueous medium containing a sufficient amount of an alkali metal hydroxide to make the medium strongly alkaline until a direct bond is formed between the N and $CH_2$ of the formula in which X, Y and Alk stand for the same groups as above, and Z is the acid radical of a strong acid.

The radiopaque acids of the invention are water insoluble, and are precipitated from the alkaline reaction medium when the latter is acidified. The ring closing reaction takes place even in the cold, and no advantages are generally gained by raising the temperature of the alkaline medium.

Typically, Z may be halogen (chlorine, bromine, or iodine), or the acid radical of sulfuric acid ($HSO_4$) or the acyl radical of an alkyl or arylsulfonic acid such as ethane-, benzene-, α- or β-naphthalene sulfonic acid. The intermediates of the last-mentioned formula are novel in themselves and important elements of the invention.

DESCRIPTION OF SPECIFIC EMBODIMENTS

The following examples are further illustrative of the invention, but it will be understood that the invention is not limited thereto.

Example 1

456 g. (0.8 mole) α-ethyl-β-3-amino-2,4,6-triiodophenyl-propionic acid and 142 g. γ-chlorobutyryl chloride in 1500 ml. dioxane were heated to 90° C. for three hours. The reaction mixture was stirred into water, whereupon crystals formed within a few hours. The crystalline α-ethyl-β-(3-γ-chlorobutyrylamino - 2,4,6 - triiodophenyl)-propionic acid so obtained was recrystallized from 6000 ml. ethyl acetate and had a melting point of 165–166° C.

384 g. (0.57 mole) α-ethyl-β-(3-γ-chlorobutyrylamino-2,4,6-triiodophenyl)-propionic acid were dissolved in 850 ml. 2.67-normal aqueous potassium hydroxide solution, and the solution was agitated at 70° C. for three hours. It was then cooled to ambient temperature, diluted with 3 liters water, and extracted with ethyl ether.

The aqueous phase was exposed to a vacuum to remove dissolved ether, decolorized with active carbon, and acidified with hydrochloric acid, whereby crude α-ethyl-β-3-N-butyrolactamyl-2,4,6-triiodophenyl-propionic acid was precipitated. When separated from the mother liquor, the product weighed 324 g. (89% yield) and had a melting point of 115–120° C. When treated with 1100 ml. boiling ethyl acetate, it became crystalline and had a melting point of 179–181° C. It showed a single spot at $R_F=0.62$ when subjected to thin layer chromatography on silica gel GF 254 (Merck) with a solvent system of butyl acetate/glacial acetic acid/water in a ratio of 5:1:1. It was identified as $C_{15}H_{16}I_3NO_3$ by its iodine content and its equivalent weight:

Equivalent weight: Calc. 639.03; found 640. Iodine: Calc. 59.58%; found 59.64%.

The free acid is insoluble in water, but readily soluble in hot methanol or ethanol. The sodium and N-methylglucamine salts are soluble in approximately equal weights of water at 20° C.

Example 2

22.8 g. α-ethyl-β-3-amino-2,4,6-triiodophenyl-propionic acid and 7.8 g. β-chloroethoxyacetyl chloride in 160 ml. dioxane were heated to 90° C. for three hours, and enough water was added to the reaction mixture to precipitate α-ethyl-β-(3-β-chloroethoxyacetylamino - 2,4,6 - triiodophenyl)-propionic acid which, when recrystallized from ethanol, melted at 165° C. The yield was 19.8 g. (72% yield).

6.9 g. (0.01 mole) α-ethyl-β-(3-β-chloroethoxyacetylamino-2,4,6-triiodophenyl)-propionic acid were dissolved in 15 ml. 2.67-normal aqueous potassium hydroxide. The solution obtained was left to stand for about 14–24 hours and thereafter extracted with ethyl ether. The aqueous phase was acidified with hydrochloric acid, whereby crude, amorphous α-ethyl - β - 3-(morpholinon-3'-yl-4')-2,4,6-triiodophenyl-propionic acid was precipitated in an amount of 4.5 g. (69% yield). It had a melting point of 115–120° C.

When treated with 9 ml. boiling ethyl acetate, the product was obtained in crystalline form. M.P. 163–164° C. (decomp.). It gave a single spot at $R_F=0.35$ when subjected to thin layer chromatography on silica gel GF 254 with a solvent system of ethyl acetate/isopropanol/concentrated ammonium hydroxide solution 11:7:4, and was identified as $C_{15}H_{16}I_3NO_4$ by its equivalent weight and iodine content:

Equivalent weight: Calc. 655.03, found 656. Iodine: Calc. 58.13%, found 58.08%.

The free acid is insoluble in water and ethyl ether, but readily soluble in methanol and ethanol. Its sodium and N-methylglucamine salts, which are prepared as described in Example 1, dissolved at 20° C. in about equal weights of water.

Example 3

28.5 g. α-ethyl-β-3-amino-2,4,6-triiodophenyl-propionic acid were dissolved in 150 ml. dioxane at 90° C., and 12 g. γ-bromovaleryl chloride were added drop by drop. The reaction mixture was kept at 90° C. for three hours, then cooled, and poured into one liter water. The precipitated α-ethyl - β - (3-N-γ-bromovalerylamino - 2,4,6 - triiodophenyl)-propionic acid became crystalline after about three hours. It was filtered off with suction and washed with much water. M.P. 80–100° C.

The crystalline material (35 g.) was dissolved in 120 ml. 1.83-normal aqueous potassium hydroxide, and the solution was left to stand overnight. It was then diluted with water to 1000 ml. and acidified with hydrochloric acid, whereby 30 g. (92% yield) crude α-ethyl-β-(3-N-δ-valerolactamyl-2,4,6-triiodophenyl)-propionic acid were precipitated. M.P. 95°–100° C.

The crude acid was dissolved in very dilute aqueous sodium hydroxide solution from which impurities were removed by extraction with ether. The aqueous residue was exposed to a vacuum to remove ether, and was then acidified to precipitate purified, but amorphous α-ethyl-β-(3-N-δ-valerolactamyl - 2,4,6 - triiodophenyl)-propionic acid of melting point 105–110° C. in an amount of 27 g. (83% yield). It gave a single spot at $R_F=0.52$ when subjected to thin layer chromatography on silica gel GF 254 with a solvent system of chloroform/glacial acetic acid= 95:5.

It was identified as $C_{16}H_{18}I_3NO_3$ by its equivalent weight and iodine content:

Equivalent weight: Calc. 653.04; found 654. Iodine: Calc. 58.30%; found 58.29%.

The free acid is practically insoluble in water, but readily soluble, in methanol, ethanol, ethyl acetate, and chloroform. The sodium and N-methylglucamine salts are soluble in approximately equal weights of water at 20° C.

Example 4

6.6 g. (0.01 mole) α-(3-γ-chlorobutyrylamino-2,4,6-triiodophenyl)-butyric acid were heated in 15 ml. 2.67-normal aqueous potassium hydroxide solution to 70° C. for three hours with vigorous agitation. The reaction mixture was then diluted with 100 ml. water, and extracted with ethyl ether. Ether was removed from the aqueous phase by an applied vacuum, and the liquid was acidified with hydrochloric acid, whereby α-(3-N-butyrolactamyl-2,4,6-triiodophenyl)-butyric acid was precipitated. When recrystallized from ethyl acetate, it melted at 225°–227° C. It showed a single spot at $R_F=0.54$ when subjected to thin layer chromatography on silica gel GF 254 with a solvent mixture of chloroform/glacial acetic acid=19:1. It was identified as $C_{14}H_{14}I_3NO_3$ by its equivalent weight and its carbon and iodine contents:

Equivalent weight: calc. 624.98; found 630. Carbon: calc. 29.90%; found 26.95%. Iodine: calc. 60.92%; found 60.81%.

The free acid is practically insoluble in water and chloroform, and only sparingly soluble in methanol and ethanol. The sodium and N-methylglucamine salts dissolve in approximately equal weights of water at 20° C.

The α-(3-γ-chlorobutyrylamino-2,4,6-triiodophenyl)-butyric acid employed as a starting material was prepared in the following sequence of steps:

48.8 g. α-3-nitrophenylpropyl bromide in 160 ml. boiling ethanol were mixed with a solution of 13 g. potassium cyanide in 24 ml. water. The solution obtained was stirred for 3 hours while boiling, then partly evaporated in a vacuum, mixed with water, and extracted with ethyl ether. The ether extract was dried and evaporated to dryness, and the residue was distilled in a vacuum. 18.5 g. α-3-nitrophenylbutyronitrile were thus obtained. B.P. 150° C. at 2 torr, M.P. 44° C.

19 g. α-3-nitrophenylbutyronitrile and 200 ml. 50% sulfuric acid were refluxed for five hours, and the reaction mixture was then poured over 300 g. ice. The product thereby precipitated was dissolved in warm aqueous NaOH solution and again precipitated by hydrochloric acid. It was ultimately recrystallized from 50% aqueous ethanol. 15.6 g. α-3-nitrophenylbutyric acid (74% yield) were thus obtained. M.P. 117°–118° C.

12.6 g. α-3-nitrophenylbutyric acid were hydrogenated in an ethanol medium in the presence of Raney nickel. The hydrogenation mixture was evaporated to dryness, and the residue was recrystallized from water to yield α-3-aminophenylbutyric acid which melts at 60–61° C.

3.95 g. α-3-aminophenylbutyric acid were dissolved in 1800 ml. water containing 5 ml. 18% hydrochloric acid. 60 ml. 1-normal $KICl_2$ were added, and the mixture was stirred six hours at 20°–25° C. 10 ml. more $KICl_2$ solution were then added, and stirring was continued for 15 hours at 60° C. The crude α-3-amino-2,4,6-triiodophenyl-butyric acid was dissolved in NaOH solution and precipitated with hydrochloric acid, caused to crystallize by boiling in ethyl acetate, and recrystallized from ethanol. The pure compound weighed 6.0 g. (53% yield) and had a melting point of 166°–167° C.

11.2 g. α-3-amino-2,4,6-triiodophenyl-butyric acid were heated with 3.5 g. γ-chlorobutyryl chloride in 100 ml. dioxane to 90° C. for 3 hours, and the α-3-(γ-chlorobutyrylamino-2,4,6-triiodophenyl)-butyric acid was precipitated with water. It melted at 80°–90° C. and was obtained in an amount of 12.8 g. (96% yield).

Example 5

11.2 g. α-3-amino-2,4,6-triiodophenyl-butyric acid were heated to 90° C. for three hours in 100 ml. dioxane with 3.9 g. β-chloroethoxy-acetyl chloride. The α-(3-β-chloroethoxyacetylamino-2,4,6-triiodophenyl)-butyric acid thereby prepared had a melting point of 158°–159° C. when recrystallized from ethyl acetate.

6.8 g. (0.01 mole) α-(3-β-chloroethoxyacetylamino-2,4,6-triiodophenyl)-butyric acid were stirred vigorously in 15 ml. 2.67-normal KOH solution for three hours at 70° C., and the reaction mixture was diluted with 100 ml. water, extracted with ether, and acidified, whereby α-3-(morpholinon-3'-yl-4')-2,4,6 - triiodophenylbutyric acid was precipitated. When recrystallized from ethyl acetate, the compound melted at 227°–229° C. and weighed 4.6 g. (73% yield). It gave a single spot at $R_F=0.64$ when subjected to thin layer chromatography on silica gel with a solvent mixture of chloroform/glacial acetic acid=19:1, and was identified as $C_{14}H_{14}I_3NO_4$ by analysis:

Equivalent weight: calc. 640.98; found 647. Carbon: calc. 26.23%; found 26.19%. Iodine: calc. 59.40%; found 59.47%.

The free acid is insoluble in water, sparingly soluble in methanol, ethanol, and chloroform. The sodium and N-methylglucamine salts dissolve at 20° C. in equal weights of water.

Example 6

26.5 g. 3-amino-2,4,6-triiodophenylacetic acid were heated with a small excess of γ-chlorobutyryl chloride in 200 ml. dioxane to 90° C. for three hours and the 3-γ-chlorobutyrylamino-2,4,6-triiodophenylacetic acid was precipitated by the addition of much water. 31.3 g. were recovered (99% yield) and had a melting point of 220°–222° C.

6.3 g. (0.01 mole) 3-γ-chlorobutyrylamino-2,4,6-triiodophenylacetic acid were dissolved in 15 ml. 2.67-normal KOH solution, and the solution so obtained was left to stand overnight, then diluted with water and acidified with hydrochloric acid, whereby 3-N-butyrolactamyl-2,4,6-triiodophenylacetic acid was precipitated. It was recrystallized from ethanol, and the purified compound weighed 5.8 g. and had a melting point of 262°–264° C. It was identified as $C_{12}H_{10}I_3NO_3$ by analysis:

Equivalent weight: calc. 596.93; found 598. Iodine: calc. 63.78%; found 63.90%.

The free acid is practically insoluble in water and chloroform and only sparingly soluble in methanol and ethanol. The sodium and N-methylglucamine salts dissolve at 20° C. in equal weights of water.

Example 7

21.2 g. 3-amino-2,4,6-triiodophenylacetic acid and 7.8 g. β-chloroethoxyacetyl chloride were heated in 160 ml. dioxane as described above, and 24 g. 3-β-chloroethoxyacetylamino-2,4,6-triiodophenylacetic acid (86% yield, M.P. 175° C.) were obtained after recrystallizing from ethanol.

6.5 g. (0.01 mole) 3-β-chloroethoxyacetylamino-2,4,6-triiodophenylacetic acid were dissolved in 22 ml. 1.82-normal KOH, the solution was left to stand overnight and was then diluted with water and acidified to precipitate 3-(morpholinon-3'-yl-4')-2,4,6-triiodophenylacetic acid of which 5.2 g. were recovered (85% yield). When recrystallized from 95% ethanol, the compound had a melting point of 252° C. (decomp.) and produced a single spot at $R_F=0.33$ when subjected to thin layer chromatography on silica gel with a solvent system of ethyl acetate/isopropanol/conc. ammonium hydroxide=11:7:4. It was identified as $C_{12}H_{10}I_3NO_4$ by analysis:

Equivalent weight: calc. 612.97; found 613. Iodine: calc. 62.11%; found 61.97%.

The free acid is practically insoluble in water, diethyl ether, chloroform, and ethyl acetate, and sparingly soluble in methanol and ethanol. The sodium and N-methylglucamine salts dissolve at 20° C. in equal weights of water.

Example 8

3.5 g. γ-chlorobutyryl chloride were added drop by drop over a period of 15 minutes to a solution of 10.8 g. (0.02 mole) α-3-amino-2,4,6-triiodophenylpropionic acid in 40 ml. dioxane at 90° C. The mixture was kept at 90° C. for three hours and was then stirred into 600 ml. water. The precipitated tacky mass of α-(3-γ-chlorobutyrylamino-2,4,6-triiodophenyl)-propionic acid became crystallized when repeatedly digested with water. The yield was 12.7 g., the melting point 90–100° C., the equivalent weight 648 (calc. 647.5).

The crystalline material was dissolved in 50 ml. water containing 5.2 g. 85% KOH, and the solution was heated to 60° C. After several hours, it was diluted with 200 ml. water and acidified. The crude, amorphous α-3-N-butyrolactamyl - 2,4,6 - triiodophenylpropionic acid thereby precipitated in an amount of 10.5 g. had a melting point of 140°–160° C. and an equivalent weight of 595. It was taken up in 20 ml. acetone which was heated to a boil, whereby the compound became crystalline and now had a melting point of 260° C. The recovered pure product weighed 8 g. (65% yield). It gave a single spot at $R_F=0.49$ in a thin layer chromatogram on silican gel GF 254 with a chloroform/glacial acetic acid solvent 19:1. It was identified as $C_{13}H_{12}I_3NO_3$ by analysis:

Equivalent weight: calc. 610.96; found 607. Carbon: calc. 25.56%; found 25.54%. Iodine: calc. 62.32%; found 62.30%.

The free acid is practically insoluble even in boiling water, sparingly soluble in cold ethanol and in boiling methanol and chloroform, and moderately soluble in boiling ethanol. At 20° C., 10 g. of the sodium salt and more than 100 g. of the N-methylglucamine salt dissolve in water to make 100 ml. of solution.

The α-3-amino-2,4,6-triiodophenylpropionic acid employed above as a starting material was prepared by the following sequence of reactions:

46 g. α-3-nitrophenylethyl bromide dissolved in 160 ml. boiling ethanol were mixed with a solution of 15 g. KCN in 24 ml. water. The solution was kept at a boil and stirred for 3 hours, partly evaporated in a vacuum, mixed with water, and extracted with ethyl ether. The ether was evaporated from the dried extract, and the residue was distilled in a vacuum. 26.6 g. α-3-nitrophenylpropionitrile were obtained as a fraction boiling at 160°–170° C. at 3–5 mm. Hg. After recrystallization from ethanol, the compound melted at 66° C.

25 g. α-3-nitrophenylpropionitrile were suspended in 250 ml. 50% sulfuric acid, and the mixture was refluxed for 5 hours and thereafter poured into 500 ml. ice water. The precipitated crude α-3-nitrophenylpropionic acid was dissolved in warm, aqueous sodium hydroxide solution, precipitated with hydrochloric acid, and recrystallized from 50% aqueous ethanol. The pure product weighed 19.75 g. (71.5% yield) and melted at 96°–98° C.

30 g. α-3-nitrophenylpropionic acid in 225 ml. ethanol were hydrogenated in the presence of a Raney nickel catalyst. The filtrate of the hydrogenation mixture was evaporated, and the residue was washed with water and dried. It consisted of 21.8 g. α-3-aminophenylpropionic acid (88% yield) having a melting point of 100°–101° C.

4.95 g. α - 3-aminophenylpropionic acid in 3000 ml. water containing 7 ml. 18% hydrochloric acid were mixed with 87 ml. of a 1,039-normal solution of $KICl_2$, and the mixture was stirred at ambient temperature for two hours. 29 ml. more of the $KICl_2$ were added, and stirring was continued for 15 hours at 60° C. The crude product was purified by repeated dissolution in sodium hydroxide solution and precipitation by hydrochloric acid. 13 g. pure α-3-amino-2,4,6-triiodophenylpropionic acid (80% yield) were obtained and melted at 226°–228° C.

Example 9

10 g. α-3-amino-2,4,6-triiodophenylpropionic acid in 40 ml. dioxane were mixed with 3.7 g. β-chloroethoxyacetyl chloride. The mixture was kept at 90° C. for three hours and was then stirred into water, whereby 13.5 g. α-(3 - β - chloroethoxyacetylamino-2,4,6-triiodophenyl)-propionic acid were recovered. The compound had a melting point of 90°–100° C. and an equivalent weight of 663.5.

It was dissolved in 50 ml. 1.6 N potassium hydroxide, and the solution so obtained was left to stand overnight, whereupon it was diluted with 200 ml. water, filtered to remove precipitate, and acidified. The crude α-3-(morpholinon - 3' - yl - 4') - 2,4,6-triiodophenyl-propionic acid thereby precipitated weighed 11.5 g. and had a melting point of 120°–130° C. It was recrystallized from 50 ml. ethanol, whereby the melting point was raised beyond 250° C. A single spot at $R_F=0.45$ was obtained in a thin layer chromatogram on silica gel GF 254 using as a solvent chloroform/glacial acetic acid 19:1.

The compound was identified as $C_{13}H_{12}I_3NO_4$. Equivalent weight: calc. 626.96; found 627. Carbon: calc. 24.90%; found 24.99%. Iodine: calc. 60.73%; found 60.71%.

Example 10

α-(3 - N - δ - valerolactamyl-2,4,6-triiodophenyl)-propionic acid was prepared by the method of Examples 8 and 9 from 10.8 g. α-3-amino-2,4,6-triiodophenyl-propionic acid by reaction with 4.4 g. δ-bromovaleryl chloride in 40 ml. dioxane at 90° C. in three hours, and subsequent ring closure of the resulting 14 g. α-3-δ-valerylamino-2,4,6-triiodophenyl-propionic acid (M.P. 100°–110° C.) in a solution of 5.2 g. 85% KOH in 50 ml. water, and precipitation by acid.

9 g. crystalline α - (3 - N-δ-valerolactamyl-2,4,6-triiodophenyl)-propionic acid (73% yield) were obtained by heating the crude compound in a little acetone. It melted at 238°–240° C. and gave a single spot at $R_F$=0.46 in a thin layer chromatogram on silica gel GF 254 with a chloroform/glacial acetic acid mixture 19:1.

It was identified as $C_{14}H_{14}I_3NO_3$ by analysis. Equivalent weight: calc. 624.98; found 625. Carbon: calc. 26.90%; found 26.98%. Iodine: calc. 60.92%; found 60.96%.

Solutions saturated at 20° C. contain about 50 g. of the sodium or N-methylglucamine salts per 100 ml.

Example 11

1.9 g. (0.012 mole) β-chloroethoxyacetyl chloride were added drop by drop with agitation to a solution of 6.2 g. (0.01 mole) α-3-amino-2,4,6-triiodophenoxy-phenylacetic acid in 15 ml. N-di-methylacetamide at 100° C. over a period of 15 minutes. The reaction mixture was held 3 hours at 100° C., and was then poured into 100 ml. water. α - (3 - β - chloroethoxyacetylamino - 2,4,6 - triiodophenoxy)-phenylacetic acid was precipitated as a tacky mass and crystallized when treated with water (7.4 g., M.P. 70°–80° C.).

The intermediate so obtained was dissolved in 15 ml. 2.64-normal, aqueous potassium hydroxide, and the solution so obtained was left to stand overnight, diluted with 100 ml. water, filtered from solid impurities, and acidified by addition of strong acid. 5 g. α-3-(morpholinon-3'-yl-4') - 2,4,6 - triiodophenoxy-phenylacetic acid of melting point 115°–130° C. were precipitated and were recrystallized from 10 ml. acetone, whereby the melting point was raised to 200°–205° C. The compound gave a single spot at $R_F$=0.38 in a thin layer chromatogram on silica gel GF 254 with a solvent mixture of chloroform/glacial acetic acid 19:1.

It was identified as $C_{18}H_{14}I_3NO_5$ by analysis. Equivalent weight: calc. 705.03; found 710. Carbon: calc. 54.00%; found 53.92%.

The crystalline acid is practically insoluble in water, methanol, ethanol, chloroform, and sesame oil. Saturated solutions of the sodium and N-methylglucamate solutions at 20° C. contain more than 100 g. of the salts per 100 ml.

The α - 3 - amino - 2,4,6 - triiodophenoxy-phenylacetic acid was prepared as follows:

32.5 g. (0.063 mole) 3-formylamino-2,4,6-triiodophenol dissolved in a sodium ethylate solution prepared from 1.55 g. sodium and 85 ml. ethanol were mixed at 90° C. with 16.35 g. ethyl α-bromophenyl-acetate, and the mixture was refluxed for 20 hours with agitation and thereafter stirred into 600 ml. water. The 42 g. of precipitated α - 3 - formylamino - 2,4,6 - triiodophenoxy-phenylacetic acid ethyl ester were recovered, washed, and recrystallized from ethyl acetate. M.P. 151° C.

34 g. α - 3 - formylamino - 2,4,6-triiodophenoxy-phenylacetic acid ethyl ester were saponified in a boiling solution of 6 g. NaOH, 200 ml. methanol, and 500 ml. water. The saponification mixture was diluted with water and acidified to precipitate the free acid which was recrystallized from ethanol. 27 g. α-3-amino-2,4,6-triiodophenoxy-phenylacetic acid (87% yield) were obtained. M.P. 165° C. A single spot at $R_F$=0.62 was produced in a thin layer chromatogram on silica gel GF 254 with a chloroform/glacial acetic acid solvent 19:1.

The compound was identified by analysis. Equivalent weight: calc. 620.92; found 622.5. Carbon: calc. 27.08%; found 27.15%. Iodine: calc. 61.32%; found 61.14%.

Example 12

48 g. α-phenyl-β-3-aminophenyl-propionic acid dissolved in 80 ml. hydrochloric acid and 2000 ml. water were added in a stream with agitation over a period of 5 hours to a solution of 50 g. 44% iodine trichloride in 240 ml. concentrated hydrochloric acid and 6 liters water. The mixture was stirred for 12 hours at 70° C. The crude iodated product was dissolved in 500 ml. 0.4 N aqueous sodium hydroxide. The sodium salt of α-phenyl-β-3-amino-2,4,6-triiodophenyl-propionic acid was precipitated, recovered by filtration, dissolved in much water, and decolorized by addition of sodium bisulfite solution. The free acid was precipitated by addition of hydrochloric acid in an amount of 96 g. (77.5% yield). M.P. 204–205° C.

10 g. (0.05 mole) δ-bromovaleryl chloride were added dropwise with stirring within an hour to a solution of 24.8 g. (0.04 mole) α-phenyl-β-3-amino-2,4,6-triiodophenyl-propionic acid in 100 ml. dioxane at 90° C. After three hours stirring at 90° C., the reaction mixture was poured into 1000 ml. water. A tacky mass of α-phenyl-β-(3-δ-bromovalerylamino-2,4,6-triiodophenyl) - propionic acid was precipitated and crystallized, when treated with fresh water, in an amount of 31 g. M.P. 110°–111° C.

The crystalline acid so obtained was dissolved in 100 ml. of an aqueous solution of 10 g. 85% KOH, and the solution was left to stand overnight. It was then acidified with 18% hydrochloric acid, whereby 22.6 g. α-phenyl-β-(3-N-δ-valerolactamyl-2,4,6-triiodophenyl)-propionic acid of melting point 140°–150° C. were precipitated. The compound crystallized when heated in 40 ml. ethyl acetate, and the crystalline material had a melting point of 210°–212° C., and gave a single spot at $R_F$=0.53 in a thin layer chromatogram on silica gel GF 254 with a chloroform/glacial acetic acid 19:1 solvent.

It was identified as $C_{20}H_{18}I_3NO_3$ by analysis. Equivalent weight: calc. 701.10; found 705. Carbon: calc. 34.26%; found 34.28%. Iodine: calc. 54.31%; found 54.20%.

The free acid is insoluble in water and sesame oil, soluble in cold methanol, ethanol, and chloroform, very readily soluble in boiling methanol, ethanol, and chloroform. The sodium and N-methylglucamine salts dissolve in water at 20° C. at about 100 g. per 100 ml. solution.

Example 13

α-Phenyl-β-3-(morpholinon-3'-yl - 4') - 2,4,6 - triodophenyl-propionic acid was prepared by the method of Example 12 by reacting 24.8 g. α-phenyl-β-(3-amino-2,4,6-triiodophenyl)-propionic acid in 100 ml. dioxane with 7.9 g. β-chloroethoxyacetyl chloride at 90° C. with subsequent ring closure in the α-phenyl-β-(3-β-chloroethoxyacetylamino-2,4,6-triodophenyl) - propionic acid (24.8 g., M.P. 98°–100° C.) by standing in aqueous potassium hydroxide solution (8 g. 85% KOH in 100 ml. water).

The α - phenyl-β-3-(morpholinon-3'-yl-4')-2,4,6-triiodophenylpropionic acid obtained by acidifying the KOH solution and crystallizing the precipitate in a little boiling ethyl acetate melted at 205°–208° C. and gave a single spot at $R_F$=0.42 in a thin layer chromatogram on silica gel GF 254 with the aforementioned chloroform/glacial acetic acid solvent. The yield was 16 g. (57%).

The compound was identified as $C_{19}H_{16}I_3NO_4$ by analysis. Equivalent weight: calc. 703.6; found 705. Carbon: calc. 32.45%; found 32.36%. Iodine: calc. 54.15%; found 53.95%.

The free acid is insoluble in water, sparingly soluble in cold methanol and ethanol, soluble in chloroform and in boiling methanol and ethanol. Saturated solutions of the sodium and N-methylglucamine salts at 20° C. contain about 100 g. salt per 100 ml. solution.

Example 14

When 18.6 g. α-3-amino-2,4,6-triiodophenoxy-phenyl-acetic acid was reacted with 5.6 g. γ-chlorobutyryl chloride in 30 ml. dimethylacetamide for 3 hours at 90° C., as described in Example 11, and the resulting 22.5 g. of α-(3-γ-chlorobutyrylamino-2,4,6-triiodophenoxy) - phenylacetic acid (M.P. 80°–85° C.) were cyclized with 80 ml. 1.7 N aqueous potassium hydroxide solution, crude α-3-N-butyrolactamyl-2,4,6-triiodophenoxy - phenylacetic acid was precipitated from the alkaline medium by acidification. When boiled with a little acetone, the compound assumed crystalline structure. 12.5 g. (60% yield) were recovered and melted at 194°–196° C. A thin layer chromatogram with chloroform/glacial acetic acid solvent 19:1 on silica gel GF 254 showed a single spot at $R_F=0.30$.

The compound was identified as $C_{18}H_{14}I_3NO_4$ by analysis. Carbon: calc. 31.37%; found 31.30%. Iodine: calc. 55.26%; found 55.21%.

The free acid is insoluble in water, chloroform, and sesame oil, sparingly soluble in cold methanol and ethanol, and soluble in boiling methanol and ethanol. The saturated solutions of the sodium and N-methylglucamine salts at 20° C. contain about 100 g. of salt per 100 ml. solution.

Example 15

12.4 g. α-3-amino-2,4,6-triiodophenoxy-phenylacetic acid were reacted in 25 ml. dimethylacetamide with 5 g. δ-bromovaleryl chloride by the method of Example 11, and the resulting 15.1 g. of α-(3-δ-bromovalerylamino-2,4,6-triiodophenoxy)-phenylacetic acid (M.P. 80°–90° C.) were cyclized in a solution of 5.5 g. 85% KOH in 60 ml. water. When the previously diluted alkaline solution was acidified, α-(3-N-δ-valerolactamyl-2,4,6-triiodophenoxy)-phenylacetic acid was precipitated. The precipitate was made crystalline by heating in a little acetone, and then melted at 200°–201° C. The yield was 9.5 g. (65%).

A thin layer chromatogram obtained on silica gel GF 254 with chloroform/glacial acetic acid 19:1 showed a single spot at $R_F=0.49$.

The compound was identified as $C_{19}H_{16}I_3NO_4$ by analysis. Equivalent weight: calc. 703.05; found 705. Carbon: calc. 32.46%; found 32.51%. Iodine: calc. 54.15%; found 53.85%.

The free acid is insoluble in water and sesame oil, sparingly soluble even in boiling methanol, ethanol and chloroform. The saturated solutions of the sodium and N-glucamine salts at 20° C. contain about 100 g. salt per 100 ml. solution.

Example 16

12.4 g. α-phenyl - β - 3 - amino - 2,4,6 - triiodophenyl-propionic acid were reacted in 60 ml. dioxane with 3.5 g. γ-chlorobutyryl chloride at 90° C. as described in Example 12, and the 14.3 g. of the resulting crude α-phenyl-β-(3-γ-chlorobutyramino - 2,4,6 - triisodophenyl) - propionic acid (M.P. 105°–115° C.) were cyclized in a solution of 4 g. 85% KOH in 30 ml. water. The α-phenyl-β-(3-N-butyrolactamyl) - 2,4,6 - triiodophenyl) - propionic acid precipitated from the acidified solution was purified by reprecipitation from aqueous sodium hydroxide solution and recrystallization from a little ethanol. 7 g. (68% yield) of the pure product melting at 232° C. were obtained and gave a single spot at $R_F=0.49$ in a thin layer chromatogram prepared with a chloroform/glacial acetic acid 19:1 solvent.

The compound was identified as $C_{19}H_{16}I_3NO_3$ by analysis. Equivalent weight: calc. 687.06; found 683. Carbon: calc. 33.21%; found 33.20%. Iodine: calc. 55.42%; found 55.40%.

The free acid is insoluble in water and sesame oil, sparingly soluble in cold methanol, ethanol, chloroform, and benzene, but soluble in boiling methanol, ethanol and chloroform. Saturated solutions of the sodium and N-methylglucamine salts at 20° C. respectively contain approximately 100 g. and 40 g. salt per 100 ml. solution.

Example 17

The sodium salts referred to in Examples 1 to 16 were prepared by dissolving 0.25 mole of the respective free acids in about 300 to 400 ml. boiling methanol and adding a solution of 5.75 g. sodium hydroxide in 100 ml. ethanol. A clear solution was usually obtained, and crystallization of the sodium salt could usually be induced by scraping the inner wall of the glass container employed with a glass rod. If this method was not successful, the alcohol was evaporated partly or entirely to recover the salt.

Example 18

The N-methylglucamine salts of Examples 1 to 16 were prepared by mixing 0.25 mole of the free acids with 48.8 g. N-methylglucamine and adding water in small amounts until the mixture dissolved. Then 1000 to 1500 ml. ethanol were added to the aqueous solution, and crystallization of the salts was induced by scraping the inner wall of the glass container below the solution level with a glass rod or by seeding with a small amount of previously obtained crystals. It was necessary in a few cases to evaporate the solution to dryness.

Salts with other physiologically tolerated metals and amines were prepared by methods analogous to those of Examples 17 and 18.

The compounds of the invention are preferably applied orally in compositions containing the auxiliary agents and carriers usual in galenic pharmacy if the gall bladder of the patient is to be made opaque to X-rays. The compositions may be formulated as granules, tablets, capsules, sugar-coated pills, suspensions or solutions. They may also be introduced into the rectum in a liquid carrier. The following examples are merely illustrative of the basically conventional methods employed in compounding the free acids and salts described in Examples 1 to 18 with carriers and the like which are transparent to X-rays.

Example 19

5 kg. α - ethyl - β - 3 - N - butyrolactamyl-2,4,6-triiodophenyl-propionic acid were worked into a dough with 2 liters starch paste containing 100 g. corn starch on a kneading machine. When the moist mixture became tacky, a little dry starch was added, and the mass was transferred to a granulating machine. The granules so obtained were dried in a vacuum, mixed with 0.5 kg. corn starch and 25 g. magnesium stearate, and tableted. Each tablet contained 500 mg. of the radiopaque acid.

Tablets containing 500 mg. α-phenyl - β - N-butyrolactamyl - 2,4,6 - triiodophenyl-propionic acid each were prepared in the same manner.

Example 20

5 kg. sodium α-ethyl-β-3-N-butyrolactamyl - 2,4,6-triiodophenyl-propionate were mixed with 0.75 kg. granular sucrose and 0.75 kg. corn starch. The mixture was moistened with 1000 ml. 50% aqueous ethanol and granulated. The dried granules were passed through a screen, mixed with 0.65 kg. corn starch, 0.05 kg. talcum powder, and 0.05 kg. magnesium stearate and compacted into 10,000 tablets.

Substantially the same method was employed in preparing tablets containing the N-methylglucamine salt of α-ethyl-β-3-N-butyrolactamyl-2,4,6 - triiodophenyl - propionic acid and the sodium salt of α-3-(morpholinon-3'-yl-4')-2,4,6-triiodophenoxy-phenylacetic acid.

The granules obtained in Examples 19 and 20 were also compacted into pills which were coated with 25% syrup, dried and waxed.

Example 21

750 g. α - ethyl - β - 3 - N - butyrolactamyl - 2,4,6-triiodophenyl-propionic acid were stirred with 600 g. sesame oil and 100 g. lecithin of vegetal origin into a paste which was filled into 1000 soft gelatine capsules.

Example 22

Effervescent granules were prepared by mixing the following dry ingredients:

4 g. α-ethyl-β-3-(morpholinon-3'-yl-4')-2,4,6-triiodophenyl-propionic acid,
2 g. tartaric acid,
14 mg. polyoxystearate,
14 mg. sodium laurylsulfonate,
3 g. powdered sugar,
2.5 g. sodium bicarbonate.

The mixture was moistened with alcohol and granulated in the absence of water.

Example 23

2 g. sodium α-3-(morpholinon-3'-yl-4') - 2,4,6-triiodophenylbutyrate were dissolved in 50 g. sterile 0.05% sodium chloride solution. The liquid so obtained was ready for use as a radiopaque enema for children.

An analogous enema were prepared in the same manner from the choline salt of the same acid and from the corresponding N-methylglucamine salt, also from the sodium and N-methylglucamine salts of 3-N-butyrolactamyl-2,4,6-triiodophenyl-acetic acid.

Other compounds of the invention may be compounded in an analogous manner to form radiopaque compositions for oral or rectal application.

The dosage in which the compositions are to be employed will be obvious to an X-ray technician from the iodine content of the active ingredient. As a rule, cholecystography in humans requires an oral dose of 2 to 6 g. of active agent, approximately 3 g. giving a distinct outline of the gall bladder cavity under most conditions.

While the invention has been described with particular reference to specific embodiments, it is to be understood that it is not limted thereto, but is to be construed broadly and restricted solely by the scope of the appended claims.

What is claimed is:

1. A radiopaque compound which is an acid of the formula

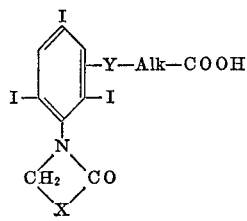

wherein X has 2 to 4 carbon atoms and is alkylene or alkylenoxyalkylene, Y is a single carbon-to-carbon bond or oxygen, and Alk is a member of the group consisting of alkylene and phenyl-alkylene, the alkylene group of said member having not more than four carbon atoms; or a physiologically tolerated salt of said acid.

2. A compound as set forth in claim 1, wherein Y is a carbon-to-carbon bond, and Alk is alkylene.

3. A compound as set forth in claim 2, which is α-ethyl-β-3-N-butyrolacetamyl - 2,4,6 - triiodophenyl - propionic acid or a salt thereof with sodium or N-methylglucamine.

4. A compound as set forth in claim 2, which is α-ethyl-β - 3 - (morpholinon-3'-yl-4') - 2,4,6 - triiodophenyl-propionic acid or a salt thereof with sodium or N-methylglucamine.

5. A compound as set forth in claim 2, which is α-ethyl-β-(3-N-δ-valerolactamyl - 2,4,6 - triiodophenyl)-propionic acid or a salt thereof with sodium or N-methylglucamine.

6. A compound as set forth in claim 2, which is α-3-N-butyrolactamyl-2,4,6-triiodophenyl-butyric acid or a salt thereof with sodium or N-methylglucamine.

7. A compound as set forth in claim 2, which is α-3-(morpholinon-3'-yl-4') - 2,4,6 - triiodophenyl-butyric acid or a salt thereof with sodium or N-methylglucamine.

8. A compound as set forth in claim 2, which is 3-N-butyrolactamyl-2,4,6-triiodophenylacetic acid or a salt thereof with sodium or N-methylglucamine.

9. A compound as set forth in claim 1, wherein Y is oxygen and Alk is phenyl-alkylene.

10. A compound as set forth in claim 9, which is α-3-N - butyrolactamyl - 2,4,6 - triiodophenoxy-phenylacetic acid or a salt thereof with sodium or N-methylglucamine.

11. A compound as set forth in claim 9, which is α-3-(morpholinon - 3'-yl-4') - 2,4,6 - triiodophenoxy-phenylacetic acid or a salt thereof with sodium or N-methylglucamine.

References Cited

UNITED STATES PATENTS

| | | | |
|---|---|---|---|
| 3,452,134 | 6/1969 | Tilly | 260—297.2 R |
| 3,446,837 | 5/1969 | Wallingford | 216—518 |

ALEX MAZEL, Primary Examiner

B. I. DENTZ, Assistant Examiner

U. S. Cl. X.R.

260—294.7, 326.5, 239, 239.3; 424—5, 248, 267, 274, 244